(No Model.)
C. S. BIRD & E. D. WESTON.
ICE TONGS.
No. 572,952.  Patented Dec. 15, 1896.
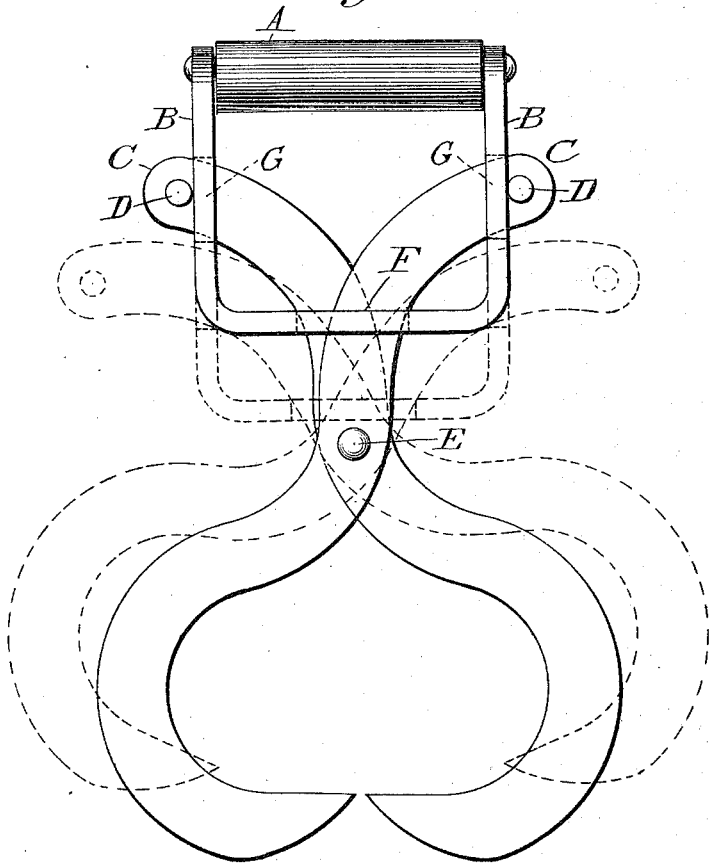
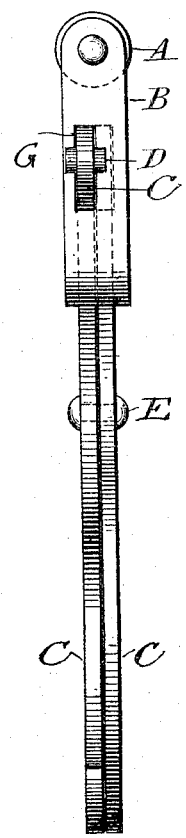
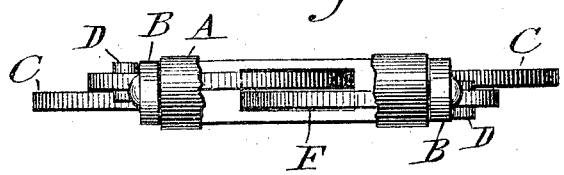
Witnesses:
H. P. Liverwood
G. H. Ligur
Inventors
Charles S. Bird
Edward D. Weston

UNITED STATES PATENT OFFICE.

CHARLES SAMUEL BIRD AND EDWARD D. WESTON, OF JACKSON, MICHIGAN.

ICE-TONGS.

SPECIFICATION forming part of Letters Patent No. 572,952, dated December 15, 1896.

Application filed March 13, 1896. Serial No. 583,122. (No model.)

*To all whom it may concern:*

Be it known that we, CHARLES SAMUEL BIRD and EDWARD D. WESTON, citizens of the United States, residing at Jackson, in the county of Jackson and State of Michigan, have invented a new and useful Tongs for Handling Ice, of which the following is a specification.

Our invention relates to improvements in tongs for handling ice or other substance in which a sliding handle operates in conjunction with the tongs; and the object of our improvement is to provide an ice-tongs that will be durable, simple, and convenient to handle. We attain this object by the mechanism illustrated in the accompanying drawings, in which—

Figure 1 is an elevation of the entire tongs. Fig. 2 is a top view showing the end of the tongs in the slot in the lower part of the yoke and the handle partly broken away. Fig. 3 is an end view showing the slot in the sides of the yoke and end of the tongs in the slot, and stop-pins.

Similar letters refer to similar parts throughout the several views.

A is the handle, secured to the yoke B by a rod passing through the handle and riveted on the outer ends to the yoke.

B is the yoke, made in the form shown in Figs. 1, 2, and 3. In the lower part of the yoke B there is a slot F. Through this slot pass upward the upper curved parts of the tongs C C and through the slots G in the perpendicular parts of the yoke B. By these slots F and G the tongs C C are held in their proper place and have a free and easy action.

E is the rivet which holds the tongs C C together; D, the projecting-pins which are placed in the upper curved ends of the tongs C C. By removing these pins D D the tongs C C may be removed from the sliding yoke. It will be seen that as the yoke B is pressed downward the tongs C C slide upward through the slots F and G and open out. Pulling upward on the handle A closes the tongs C C. The heavier the load the tighter the tongs will grip to the object to be lifted.

What we claim as our invention, and desire to secure by Letters Patent, is—

The combination of handle, A, yoke B, provided with slots F, G, G, curved tongs C, C, pivoted together and passing through said slots, and the stop-pins, D, D, in the upper ends of the tongs, substantially as shown, and described.

CHARLES SAMUEL BIRD.
EDWARD D. WESTON.

Witnesses:
   H. J. LIVERGOOD,
   GEO. H. LIGER.